United States Patent [19]
Kato et al.

[11] Patent Number: 6,101,870
[45] Date of Patent: Aug. 15, 2000

[54] TIRE AIR PRESSURE MONITORING DEVICE USING THE WHEEL OR A COIL WOUND AROUND THE STEM AS THE TRANSMITTER ANTENNA

[75] Inventors: Michiya Kato; Katsumi Orito, both of Ogaki, Japan

[73] Assignee: Pacific Industrial Co., Ltd., Gifu-ken, Japan

[21] Appl. No.: 09/146,992

[22] Filed: Sep. 4, 1998

[30] Foreign Application Priority Data

Nov. 10, 1997 [JP] Japan ................................. 9-325338
Dec. 17, 1997 [JP] Japan ................................. 9-364622

[51] Int. Cl.⁷ .................................................. B60C 23/02
[52] U.S. Cl. .......................................................... 73/146.8
[58] Field of Search ............................................. 73/146.8

[56] References Cited

U.S. PATENT DOCUMENTS

| | | | |
|---|---|---|---|
| 4,695,823 | 9/1987 | Vernon | 73/146.8 X |
| 5,335,540 | 8/1994 | Bowler et al. | 73/146.8 X |
| 5,600,301 | 2/1997 | Robinson, III . | |

FOREIGN PATENT DOCUMENTS 2639856 of 0000 Japan .

*Primary Examiner*—Joseph L. Felber
*Attorney, Agent, or Firm*—Trask, Britt & Rossa

[57] ABSTRACT

A device for monitoring the air pressure of a wheel. The device prevents a decrease in the transmission level of radio waves caused by impedance mismatch between an antenna, which radiates the radio waves, and a circuit, which produces signals that are to be radiated as the radio waves. The device includes a valve stem through which air is charged. The valve stem extends through a vehicle wheel. A transmitter is secured to the wheel to transmit a signal representing the air pressure of the wheel to a receiver installed in the vehicle. The device further includes a case attached to the wheel. The case is connected to the valve stem. An electric circuit is accommodated in the case to detect the air pressure and convert the detected pressure to an electric signal. An antenna radiates the signal produced by the electric circuit and is arranged about the valve stem. A conveying mechanism conveys the signals produced by the electric circuit to the antenna.

17 Claims, 3 Drawing Sheets

TIRE AIR PRESSURE MONITORING DEVICE USING THE WHEEL OR A COIL WOUND AROUND THE STEM AS THE TRANSMITTER ANTENNA

FIELD OF THE INVENTION

The present invention relates to air pressure monitoring devices employed in apparatuses for warning drivers of abnormalities in the air pressure of automobile tires. More particularly, the present invention relates to tire air pressure monitoring devices having antenna-incorporated transmitters that are installed in tires.

BACKGROUND OF THE INVENTION

A decrease in the air pressure of tires may degrade the driving performance and comfort of automobiles. Therefore, it is desirable that the driver recognize a decrease in tire air pressure to take the necessary measures. Accordingly, apparatuses for warning drivers of abnormalities in tire air pressure have been proposed. A typical tire air pressure warning apparatus includes a tire air pressure monitoring device. The warning apparatus sends out a warning when the air pressure of a monitored tire becomes lower than a predetermined value. Japanese Patent No. 2639856 describes one type of warning apparatus.

A monitoring device employed in the prior art is illustrated in FIG. 5. As shown in the drawing, the monitoring device is provided with a transmitter 7, which is secured to the inner side of a wheel rim 1, and a valve stem 10 through which air flows when charging the assoicated tire with air. The tranmitter 7 includes a case 2, which houses a pressure detector 3, a signal processing circuit 4, and a battery 5. The pressure detector 3 detects the air pressure of the tire. The detected air pressure is converted to electric signals and transmitted to a receiver, which is installed inside the automobile, by the signal processing circuit 4. The battery 5 energizes the signal processing circuit 4. The monitoring device 7 further includes a base 13, which is connected to the signal processing circuit 4 by a wire 6. The valve stem 10 functions as an antenna for transmitting tire air pressure signals.

The valve stem 10 and the case 2 are insert molded and formed integrally with each other. The base 13 is also formed integrally with the case 2.

An annular groove 14 extends along the surface of the base 13 to receive an O-ring 15. The valve stem 10 is fastened to the wheel rim 1 by a washer 8 and a nut 9. The washer 8 and the nut 9 also serve to seal the wheel rim 1. The wire 6 extending from the signal processing circuit 4 is soldered to the valve stem 10 to electrically connect the signal processing circuit 4 to the valve stem 10.

Under the transmission theory of radio waves, it is known that the transmission efficiency is highest when the impedance at the output side of a circuit matches the impedance at the input side of the antenna. Therefore, if the impedance of the signal processing circuit 4, which functions as the output side, does not match the impedance of the transmission antenna, which functions as the input side, the signals produced by the processing circuit 4 cannot be efficiently radiated as radio waves.

The valve stem 10 and the metal wheel rim 1 are in conductive contact with each other. Thus, impedance irregularity takes place in the transmission antenna. This results in a matching loss, or impedance mismatch, between the impedance of the signal processing circuit 4 and the impedance of the transmission circuit. As a result, the matching loss weakens the radio waves radiated from the transmission antenna. In some cases, the radio waves may not reach the receiver, which is located in the passenger compartment.

SUMMARY OF THE INVENTION

Accordingly, it is an objective of the present invention to provide a tire air pressure monitoring device that prevents a decrease in the transmission level of radio waves due to impedance mismatch between an antenna and a signal receiving circuit and thus efficiently radiates radio waves.

To achieve the above objectives, the present invention provides an air pressure monitoring device including a valve stem, through which air is charged, arranged to extend through a vehicle wheel, and a transmitter secured to the wheel to transmit a signal representing the air pressure of the wheel to a receiver installed in the vehicle. The monitoring device further includes a case attached to the wheel. The case is connected to the valve stem. An electric circuit is accommodated in the case to detect the air pressure and convert the detected pressure to an electric signal. An antenna, which radiates the signal produced by the electric circuit, is arranged about the valve stem. The monitoring device also includes a mechanism for conveying the signals produced by the electric circuit to the antenna.

Other aspects and advantages of the present invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A first embodiment of a tire air pressure monitoring device according to the present invention will now be described with reference to FIG. 1.

Figure 1:
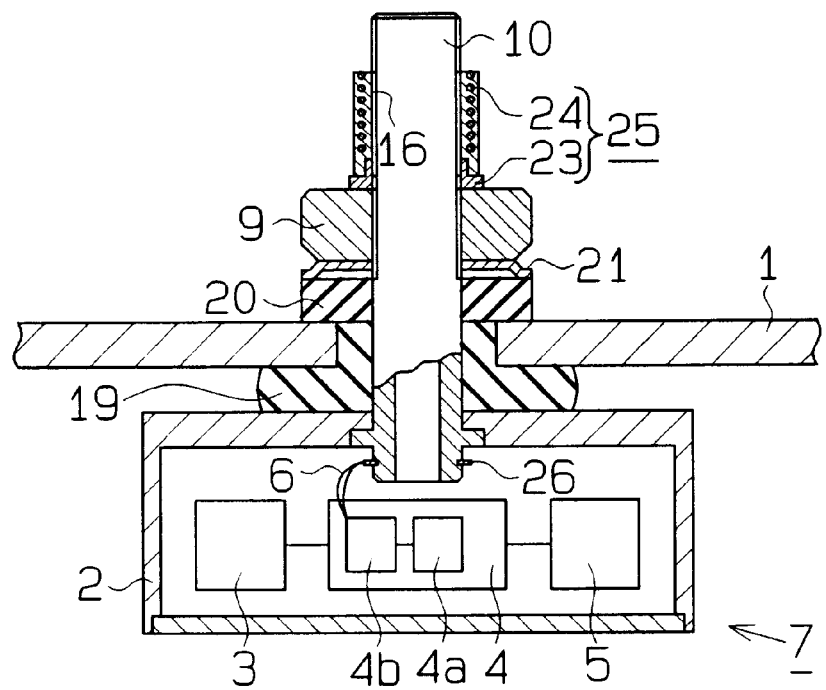
FIG. 1 is a cross-sectional view showing a first embodiment of a tire air pressure monitoring device according to the present invention.

As shown in FIG. 1, the tire air pressure monitoring device includes a transmitter 7, which is arranged in a wheel rim 1, and a valve stem 10 through which air is charged into the associated tire. The transmitter 7 has a case 2, which houses a pressure detector 3, a signal processing circuit 4, and a battery 5. The pressure detector 3 detects the air pressure of the associated tire. The detected air pressure is converted to electric signals and transmitted to a receiver, which is installed inside the automobile, by the signal processing circuit 4. The battery 5 energizes the signal processing circuit 4. The processing circuit 4 has a radio wave output circuit 4a and a matching circuit 4b. The matching circuit 4b matches the impedance of a valve stem 10 and a coiled antenna 25 with that of the transmitter 7.

The valve stem 10 has a threaded section 16 defined at its upper end. The lower portion of the valve stem 10 is insert molded with the case 2 such that the lower stem end projects into the case 2. A snap ring 26 is fitted on the inner end of the valve stem 10. A wire 6 is soldered to the snap ring 26 to connect the snap ring 26 to the matching circuit 4b. Alternatively, the snap ring 26 may be eliminated and the valve stem 10 may be directly connected to the matching circuit 4b by the wire 6.

The valve stem 20 is inserted through a valve hole formed in the wheel rim 1 from the inner side of the wheel rim 1. A nut 9 then fastens the valve stem 10 to the wheel rim 1 with grommets 19, 20 and a washer 21.

The coiled antenna 25 is insert molded. The antenna 25 includes a nut 23 and a coil 24, which is covered by an insulating material. When the nut 23 is engaged with the threaded section 16 of the valve stem 10, the antenna 25 makes conductive contact with and is fastened to the valve stem 10.

In the first embodiment, the wheel rim 1 is insulated from the valve stem 10 by the grommets 19, 20 such that the wheel rim 1 is not included in the conductive path formed by the valve stem 10. The coiled antenna 25 is fastened to the threaded section 16 of the valve stem 10. Thus, there is no decrease in the transmission level of radio waves caused by impedance mismatching. Accordingly, radio waves are radiated efficiently. Furthermore, the wheel rim 1 and the valve stem 10 are insulated from each other by the grommets 19, 20, which avoids impedance matching.

Figure 2:
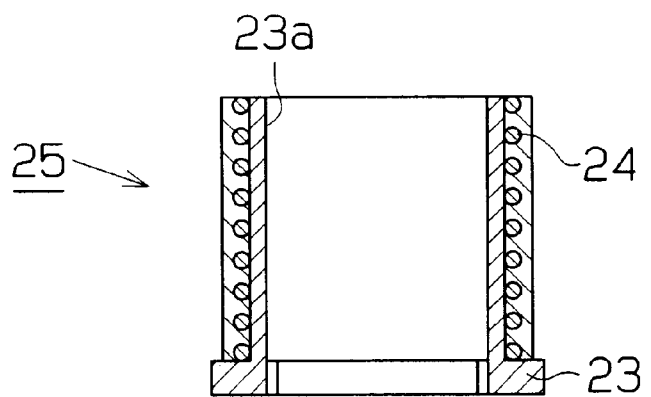
FIG. 2 is an enlarged cross-sectional view showing a coiled antenna employed in a second embodiment according to the present invention.

A second embodiment of a tire air pressure monitoring device according to the present invention will now be described with reference to FIG. 2. The second embodiment employs an antenna 25, which includes a nut 23 and a sleeve 23a. A coil 24 is wound about the sleeve 23a and is covered by an insulating material. The second embodiment has the same advantages as the first embodiment.

Figure 3:
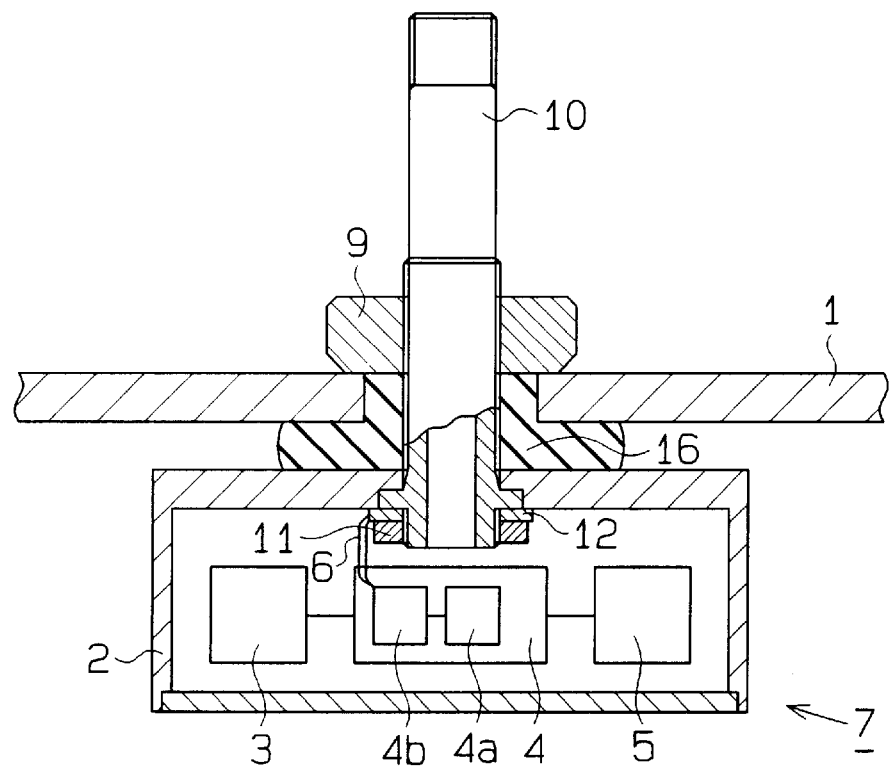
FIG. 3 is a cross-sectional view showing a third embodiment of a tire air pressure monitoring device according to the present invention.
Figure 4:
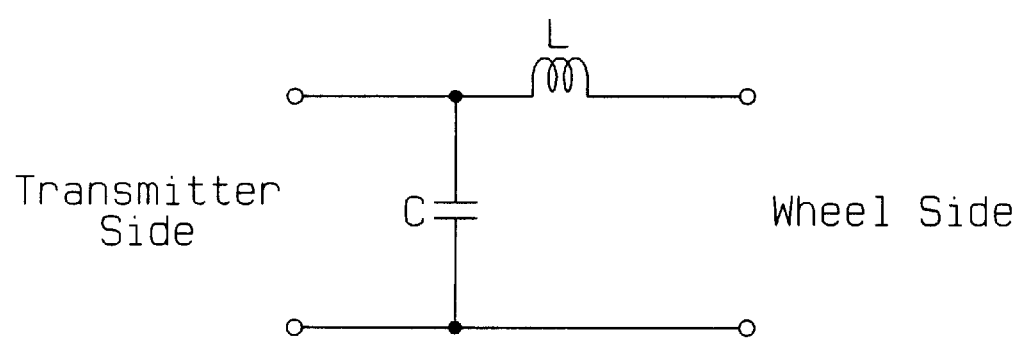
FIG. 4 is a diagram showing a matching circuit employed in the third embodiment.
Figure 5:
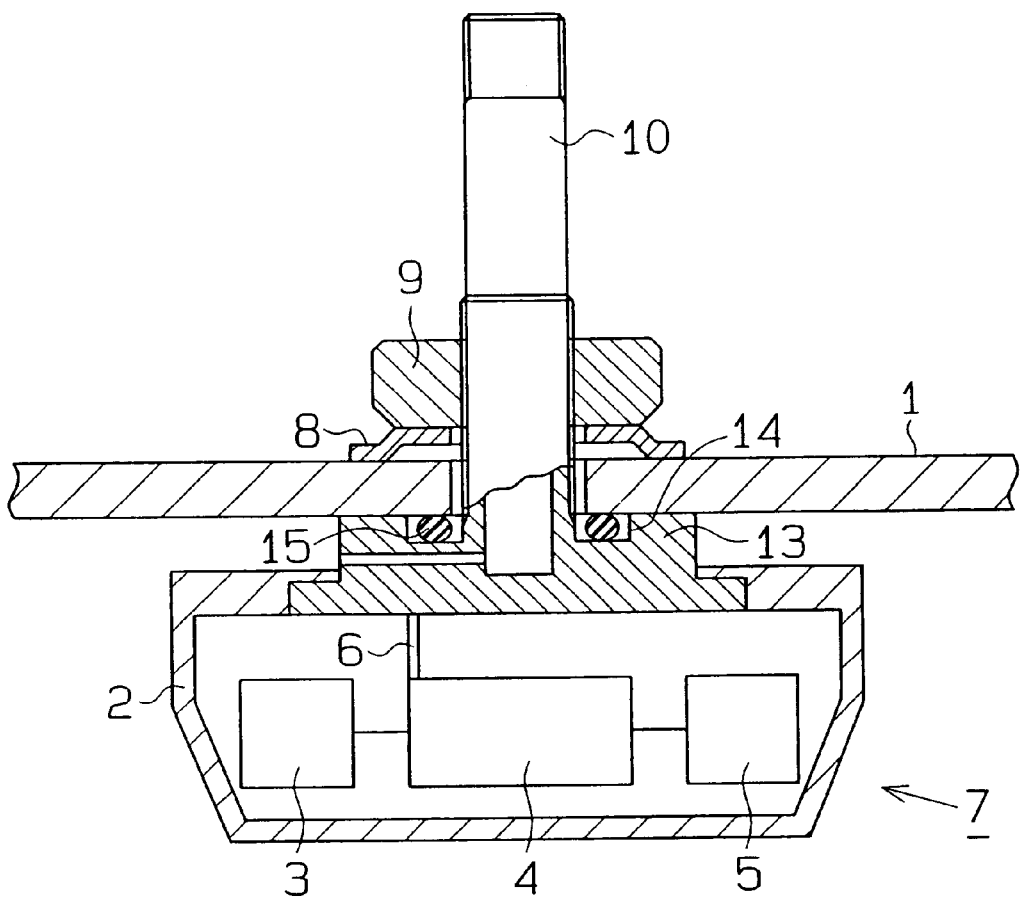
FIG. 5 is a cross-sectional view showing a prior art tire air pressure monitoring device.

A third embodiment of a tire air pressure monitoring device according to the present invention will now be described with reference to FIGS. 3 and 4. As shown in FIG. 3, the structure of the third embodiment is similar to that of the first embodiment. The monitoring device includes a transmitter 7 and a stem 10. The transmitter 7 has a case 2, which houses a pressure detector 3, a signal processing circuit 4, and a battery 5. The pressure detector 3 detects the air pressure of the associated tire. The detected air pressure is converted to electric signals and transmitted to a receiver, which is installed inside the automobile, by the signal processing circuit 4. The battery 5 energizes the signal processing circuit 4. The processing circuit 4 has a radio wave output circuit 4a and a matching circuit 4b. The matching circuit 4b matches the impedance of a transmitting antenna with that of the transmitter 7.

The valve stem 10 has a lower end (as viewed in the drawing), which is fastened to case 2 by a nut 11. A ring 12 made of a conductive material is arranged between the nut 11 and the stem end. The valve stem 10 is inserted into a valve hole, which extends through a wheel rim 1. A grommet 16 is fitted into the valve hole such as to seal the space formed between the valve stem 10 and the wheel rim 1. The valve stem 10 is fastened to the wheel rim 1 by a nut 9. A wire 6 connects the signal processing circuit 4 to the ring 12.

The signal processing circuit 4 (including the output circuit 4a and the matching circuit 4b), the wire 6, the ring 12, the valve stem 10, the nut 9, and the wheel rim 1 are electrically connected to one another. All of these components, excluding the signal processing circuit 4, are parts of a transmission antenna.

In the third embodiment, the main portion of the transmission antenna is the wheel rim 1, which has a large surface area. The remainder of the transmission antenna includes the other electrically connected components such as the valve stem 10.

The matching circuit 4b matches the impedance of the transmission antenna with that of the transmitter 7. The signals produced by the output circuit 4a are conveyed to the transmission antenna and radiated by the transmission antenna as radio waves.

An experiment was conducted to evaluate the transmission characteristics of the antenna employed by the monitoring device of the third embodiment. A valve stem 10 formed integrally with the transmitter was arranged on the wheel rim 1 in the same manner as the third embodiment. The impedance Z of the transmission antenna was represented by the equation of $Z=27.6+J20.83$ ($\Omega$). In this state, radio waves were transmitted efficiently when matching the impedance of the transmitter at 50 $\Omega$ with the matching circuit 4b of FIG. 4.

Furthermore, the main portion of the transmission antenna was the wheel rim 1, which has a surface area that is much greater than the valve stem 10. This enhanced the antenna efficiency.

The strength of radio waves transmitted by an antenna employing only the valve stem 10 was measured. The measured value of the transmission strength was 13 dB$\mu$V/m. Under the same conditions, the transmission strength of an antenna employing the wheel rim 1 and the valve stem 10 was also measured. When the impedances were matched, the transmission strength was 28 dB$\mu$V/m. It is thus evident that the transmission strength was greatly enhanced by using both the wheel rim 1 and the valve stem 10 as the antenna. Such enhancement in the transmission strength indicates that the electric field strength is increased by 5.6 times.

Impedance irregularity resulting from the vehicle body is small when installing the tire air pressure monitoring device of the third embodiment in a vehicle. It was also confirmed that the monitoring device of the third embodiment functioned properly.

The monitoring device of the third embodiment effectively extends the radiation distance of the radio waves, thus even weak waves can be received by the receiver.

In addition to the valve stem 10, components such as the wheel rim 1, which are made of conductive materials, are employed as part of the antenna in the monitoring device of the third embodiment. The employment of such conductive components enhances the antenna efficiency. Furthermore, since the matching circuit 4b adjusts the impedance of the output circuit 4a with that of the antenna, almost all of the electric power from the signal processing circuit 4 transmitted through the wire 6 can be used to radiate radio waves. Consequently, abnormalities in the tire air pressure will be accurately transmitted to the receiver.

Since electric power used for transmission need not be increased, electric power produced by the battery is conserved. This prolongs the life of the battery. In addition, since the transmitter need not employ a large-capacity battery, tire balancing remains unaffected. Imbalanced tires will degrade the driving performance and comfort of the automobile.

It should be apparent to those skilled in the art that the present invention may be embodied in many other specific forms without departing from the spirit or scope of the invention. Therefore, the present examples and embodiments are to be considered as illustrative and not restrictive, and the invention is not to be limited to the details given herein, but may be modified within the scope and equivalence of the appended claims.

What is claimed is:

1. An air pressure monitoring device comprising a valve stem, through which air is charged, arranged to extend through a vehicle wheel, and a transmitter secured to the wheel to transmit a signal representing the air pressure of the wheel to a receiver installed in the vehicle, wherein the valve stem includes a threaded section, wherein the monitoring device further comprises:

a case attached to the wheel, the case being connected to the valve stem;

an electric circuit accommodated in the case to detect the air pressure and convert the detected pressure to an electric signal;

an antenna, which radiates the signal produced by the electric circuit, arranged about the valve stem, and wherein the antenna includes:
      a nut fastened to the threaded section;
      a coil wound about the valve stem; and
      an insulating material for covering the coil and securing the coil to the nut; and a means for conveying the signals produced by the electric circuit to the antenna.

2. The monitoring device according to claim 1, wherein the electric circuit includes:

a detecting circuit for detecting the air pressure and converting the detected pressure to an electric signal;

a signal processing circuit for processing the electric signal in a predetermined manner to radiate the electric signal of the detecting circuit by a radio wave; and a power source for supplying the signal processing circuit with electric power.

3. The monitoring device according to claim 2, wherein the valve stem is made of a conductive material, and wherein the conveying means includes the valve stem and a wire for connecting the valve stem to the signal processing circuit.

4. The monitoring device according to claim 2, wherein the signal processing circuit includes a matching circuit for matching the impedance of the electric circuit with the impedance of the antenna and an output circuit for outputting the radio wave.

5. The monitoring device according to claim 1, wherein the antenna further includes a sleeve fitted on the valve stem, and wherein the coil is wound about the sleeve.

6. An air pressure monitoring device comprising a valve stem, through which air is charged, arranged to extend through a vehicle wheel, a transmitter secured to the wheel to transmit a signal representing the air pressure of the wheel to a receiver installed in the vehicle, wherein the monitoring device further comprises:

a case attached to the wheel, the case being connected to the valve stem;

an electric circuit accommodated in the case to detect the air pressure and convert the detected pressure to an electric signal;

a coiled antenna for radiating the signal produced by the electric circuit, the antenna being wound about the valve stem; and a means for conveying the signals produced by the electric circuit to the antenna.

7. The monitoring device according to claim 6 further comprising:

a threaded section defined on the valve stem;

a nut fastened to the threaded section; and an insulating material for covering the coiled antenna and securing the coiled antenna to the nut.

8. The monitoring device according to claim 6 further comprising:

a threaded section defined on the valve stem;

a nut fastened to the threaded section;

a sleeve fitted on the valve stem and fixed to the nut, wherein the coiled antenna is wound about the sleeve; and an insulating material for covering the coiled antenna.

9. An air pressure monitoring device comprising a valve stem, through which air is charged, arranged to extend through a vehicle wheel, a transmitter secured to the wheel to transmit a signal representing the air pressure of the wheel to a receiver installed in the vehicle, wherein the monitoring device further comprises:

a case attached to the wheel, the case being connected to the valve stem;

an electric circuit accommodated in the case to detect the air pressure and convert the detected pressure to an electric signal; and a conveying means for conveying the signals produced by the electric circuit to the valve stem and the wheel, wherein the valve stem and the wheel are electrically conductive and are used as an antenna that radiates the signal.

10. The monitoring device according to claim 9, wherein the electric circuit includes:

a detecting circuit for detecting the air pressure and converting the detected pressure to an electric signal;

a signal processing circuit for processing the electric signal in a predetermined manner to radiate the electric signal of the detecting circuit by a radio wave; and a power source for supplying the signal processing circuit with electric power.

11. The monitoring device according to claim 10, wherein the conveying means includes a wire for connecting the valve stem to the signal processing circuit and a fastener for fastening the valve stem to the wheel.

12. The monitoring device according to claim 11, wherein the valve stem further includes:

a first threaded section located outside the wheel;

a second threaded section located inside the wheel;

a first nut threaded on the first threaded section; and a second nut threaded on the second threaded section and fixing the case to the wheel by cooperating with the first nut, the fastener being formed by the first threaded section, the second threaded section, the first nut, and the second nut.

13. The monitoring device according to claim 12, wherein a grommet seals the space between the case and the wheel.

14. The monitoring device according to claim 10, wherein the signal processing circuit includes a matching circuit for matching the impedance of the electric circuit with the impedance of the antenna and an output circuit for outputting the radio wave.

15. A transmitter for transmitting a signal representing the air pressure of a wheel to a receiver installed in a vehicle, the transmitter being secured to the wheel, wherein the transmitter comprises;

a case attached to the wheel;

an electric circuit accommodated in the case to detect the air pressure and convert the detected pressure to an electric signal; and a means for conveying the signals produced by the electric circuit to the wheel, wherein the wheel is used as an antenna that radiates the signal.

16. The transmitter according to claim 15, wherein the electric circuit includes:

a detecting circuit for detecting the air pressure and converting the detected pressure to an electric signal;

a signal processing circuit for processing the electric signal in a predetermined manner to radiate the electric signal of the detecting circuit by a radio wave; and a power source for supplying the signal processing circuit with electric power.

17. The transmitter according to claim 16, wherein the signal processing circuit includes a matching circuit for matching the impedance of the electric circuit with the impedance of the antenna and an output circuit for outputting the radio wave.

* * * * *